[11] 3,575,485

[72] Inventor Lyman F. Van Buskirk
 Ridgecrest, Calif.
[21] Appl. No. 789,094
[22] Filed Jan. 2, 1969
[45] Patented Apr. 20, 1971
[73] Assignee the United States of America as represented by the Secretary of the Navy

[54] HOLOGRAPHIC MAGNIFIER
 2 Claims, 5 Drawing Figs.
[52] U.S. Cl.................................... 350/3.5,
 178/7.85, 350/162
[51] Int. Cl...................................... G02b 27/00,
 G02b 5/18
[50] Field of Search......................... 350/3.5,
 162 (P); 178/(Inquired), 7.85

[56] References Cited
 UNITED STATES PATENTS
 3,405,614 10/1968 Lin et al........................ 350/3.5

OTHER REFERENCES
Kock, PROC. OF THE IEEE, Vol. 54, No. 11, Nov. 1966 pp. 1610—1612 (copy in 350/3.5)
 Kock et al, Ibid, pp. 1599—1601 (copy in 350/3.5)
 Leith et al., JOURNAL OF THE OPTICAL SOCIETY OF AMERICA, Vol. 57 No. 5 May, 1967, p. 699 (copy in 350/3.5)
 Schnar et al. NATURE, Vol. 215, No. 5098, July 1967, pp. 239—241

*Primary Examiner*—David Schonberg
*Assistant Examiner*—Ronald J. Stern
*Attorneys*—Edgar J. Brower and Roy Miller ABSTRACT: A magnifier constructed of a hologram having the characteristic that when a monochromatic light source, such as a television cathode-ray tube, is placed at a specified distance from the hologram, the television image as viewed through the hologram is magnified.

PATENTED APR 20 1971 3,575,485

INVENTOR.
LYMAN F. VAN BUSKIRK
BY
ROY MILLER
ATTORNEY.

HOLOGRAPHIC MAGNIFIER

GOVERNMENT INTEREST

The invention described herein may be manufactured and used by or for the Government of the United States of America for governmental purposes without the payment of any royalties thereon or therefor.

BACKGROUND OF THE INVENTION

In certain applications it is desirable to magnify the image appearing on a television cathode ray tube. Conventional magnification means, such as glass or plastic lenses, are too heavy and bulky in many cases. A magnifier constructed of a hologram would be light and inexpensive to manufacture.

A typical hologram is created by exposing a high-resolution photographic plate, without camera or lenses, near a subject illuminated by monochromatic spatially coherent light. A true three-dimensional image of the subject is formed and may be viewed by illuminating the hologram with a beam of monochromatic spatially coherent light. Such a typical hologram, however, is not suitable for use as a holographic magnifier.

SUMMARY OF THE INVENTION

In accordance with the present invention, a hologram is prepared by exposing a photographic plate with two monochromatic spatially coherent light wave fronts. The first, or reference wave front, is a plane wave front which illuminates one side of the photographic plate. A portion of the reference wave front is split off and by means of an optical fiber is caused to appear as a point source which illuminates a point on the other side of the photographic plate. When the first and second wave fronts simultaneously illuminate both sides of the photographic plate, a fresnel diffraction pattern is formed. For each different point that the optical fiber illuminates, a new fresnel diffraction pattern is formed.

To make the hologram of the invention, a multiplicity of fresnel diffraction patterns are formed. When the resulting hologram is illuminated by monochromatic light, a point source at infinity for each fresnel diffraction pattern will appear by wave front reconstruction when the hologram is viewed from the side opposite the monochromatic light source.

A television cathode ray tube may be considered a source of monochromatic light for image reconstruction if the screen of the television cathode-ray tube is placed at the same distance from the hologram as the optical fiber point source was placed at the time the hologram was exposed. The sections of the television screen which emit light will cause corresponding fresnel diffraction patterns to produce point sources at infinity. When viewed from the side of the hologram opposite the side illuminated by the screen of the television cathode-ray tube, the reconstructed point sources will reproduce the picture appearing on the screen of the cathode-ray tube, and the picture will appear magnified.

DESCRIPTION OF THE PREFERRED EMBODIMENT

Figure 1:
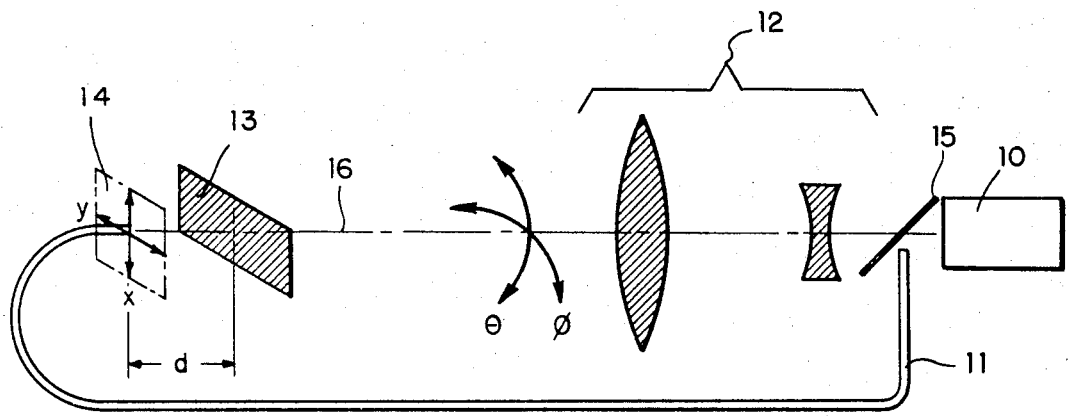
FIG. 1 is a schematic of the apparatus used for making the hologram of the invention.

Referring to FIG. 1, laser 10 emits a plane wave front of monochromatic spatially coherent light 16 which passes through beam splitter 15 and beam broadening optics 12 to illuminate one photosensitive side of photographic plate 13. A portion of plane wave front 16 is split off by beam splitter 15 and channeled into optical fiber 11. The optical fiber carries the split off portion of plane wave front 16 to a point on plane 14 which is located distance $d$ away from the photosensitive side of photographic plate 13 opposite the side illuminated by plane wave front 16. The monochromatic spatially coherent light emanating from the end of optical fiber 11 approximates a point source because of the small diameter of the optical fiber.

The end of optical fiber 11 at plane 14 is capable of movement within that plane in directions $x$ and $y$. Laser 10 and beam broadening optics 12 are also capable of movement so that beam 16 moves through angles and $\Phi$.

The end of optical fiber 11 makes a raster scan. Its position within plane 14 changes in a timed relationship with the angle at which plane wave front 16 impinges upon photographic plate 13. As the end of optical fiber 11 moves from the top to the bottom of plane 14, the angle at which plane wavefront 16 impinges upon photographic plate 13 angularly varies as a function of $\Theta$. Similarly, as the end of optical fiber 11 moves horizontally within plane 14, wave front 16 moves in a timed relationship along angular path $\Phi$. Laser 10 is pulsed to obtain separate exposures while the end of optical fiber 11 scans plane 14 and plane wave front 16 rotates along paths $\Theta$ and $\Phi$. The movement of optical fiber 10 and wave front 16 may be in steps or slowly continuous, since in either case sharp separate exposures will result.

The purpose of the movement is to obtain numerous exposures at various angles of incidence such that each point illuminated on the face of a cathode-ray tube will produce a plane wave (emanating from the hologram) at the same angle to the hologram as plane wave 16 was for a similarly positioned point source. That is, in utilizing the hologram the construction process is approximately reversed. An illuminated point on the CRT replaces the point source. The angle between the hologram and the plane wave remains the same for that particular point. The plane wave, however, is now emanating from the hologram.

Figures 2, 3, 4:
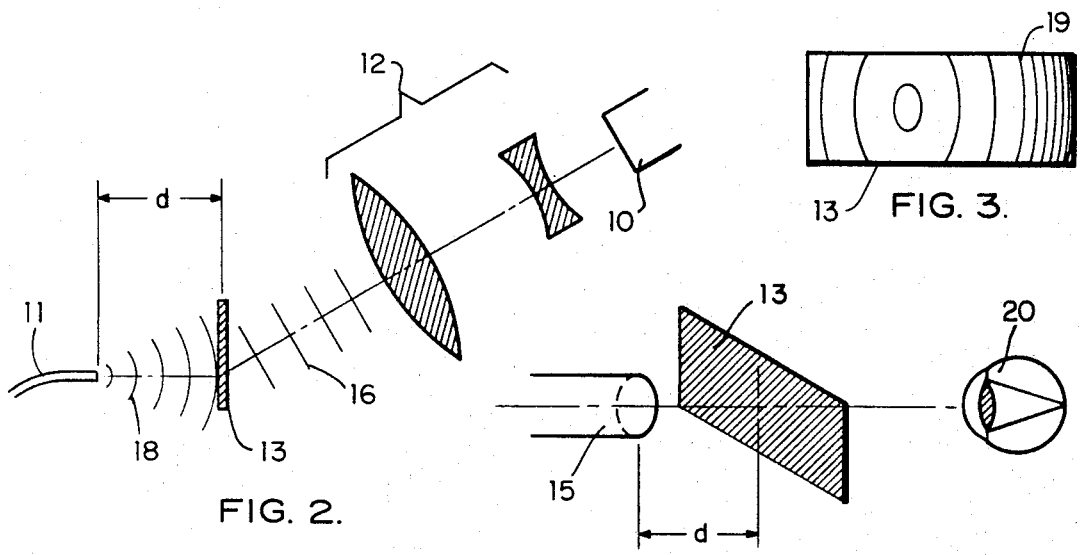
FIG. 2 is a detail showing the interaction of spherical and plane wave fronts to form a fresnel diffraction pattern on a photographic plate to form a hologram.
FIG. 3 shows the fresnel diffraction pattern for a single point formed by the interaction of wave fronts as shown in FIG. 2.
FIG. 4 is a schematic of the hologram in use to enlarge the picture on a television screen.

FIG. 2 shows the interaction between spherical wave front 18 produced by the light emanating from the end of optical fiber 11 and plane wave front 16 emanating from laser 10 to form fresnel diffraction pattern 19 shown in FIG. 3. During the scanning cycle, a plurality of fresnel diffraction patterns are exposed on photographic plate 13.

At the end of the scanning cycle photographic plate 13 is developed to produce a hologram.

Referring to FIG. 4, a television cathode-ray tube 15 is placed so that the face is parallel to and distance $d$ away from hologram 13. The characteristic light emitted from a television cathode-ray tube will approximate a source of monochromatic light for a short distance. Thus when television cathode-ray tube 15 is placed parallel to and near hologram 13, the light emanating therefrom approximates many point sources of monochromatic light. When viewed from the side of the hologram opposite that illuminated by the light from television cathode ray tube 15, human eye 20 will perceive the image on television cathode ray tube 15 as being magnified.

Figure 5:
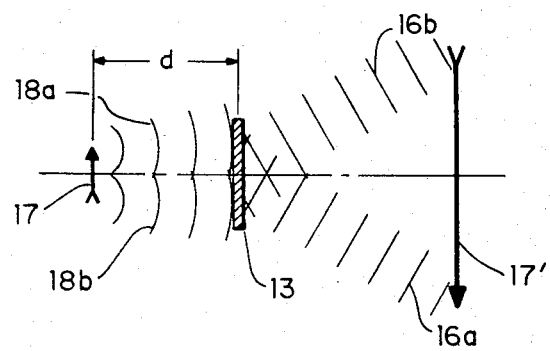
FIG. 5 is a ray diagram showing the hologram enlarging an image.

FIG. 5 is a ray diagram showing hologram 13 enlarging an image 17. Arrow 17 represents a figure on the face of television cathode-ray tube 15 placed at distance $d$ away from holographic plate 13. Arrow 17 is comprised of many point sources each of which emanates a spherical wave front. When spherical wave fronts 18$a$ and 18$b$, corresponding to points at the top and bottom of arrow 17, illuminate holographic plate 13, plane wave fronts 16$a$ and 16$b$, respectively, will be reconstructed by holographic plate 13.

Plane wave front 16a and plane wave front 16b create an enlarged arrow 17' at infinity by wave front reconstruction. Similarly, each point on the screen of television cathode-ray tube 15 will produce a point source which will cause corresponding fresnel diffraction patterns located on hologram 13 to produce corresponding point images at infinity. When viewed from the side of hologram 13 opposite the side illuminated by the screen of television cathode-ray tube 15, the reconstructed point sources will reproduce corresponding plane wave fronts which will form a magnified image of the picture appearing on the screen of television cathode-ray tube 15.

I claim:

1. A method of making a holographic magnifier comprising:

splitting a plane wave front of monochromatic spatially coherent light into first and second plane wave fronts;

directing the first plane wave front towards a first photosensitive side of a photographic plate;

converting the second plane wave front into a divergent spherical wave front;

directing the spherical wave front towards the other photosensitive side of the photographic plate, and periodically changing the angle at which said spherical wavefront impinges on said photographic plate such that the origin of said spherical wavefront scans a plane situated parallel to and at a fixed distance away from said plate;

the step of directing said first plane at which said plane wavefront impinges on said plate such that the direction of propagation of said plane wavefront is always normal to a sphere whose origin is at the center of the photographic plate, each direction of said plane wavefront corresponding to one angle at which said second wavefront impinges on said plate such that said plane wavefront makes a fixed minimum angle with respect to the plane of said plate when the origin of said spherical wavefront is at an end point of its scan in any direction and is normal to said plate when the origin of said spherical wavefront is normal to the center of said plate;

exposing said photographic plate to said plane and spherical wave fronts for each corresponding position of said wavefronts to produce a plurality of latent fresnel diffraction patterns;

developing said photographic plate to produce said plurality of fresnel diffraction patterns;

whereby when said developed photographic plate is positioned parallel to and at said fixed distance away from the face of a cathode-ray tube, an image on said tube when viewed through said developed plate is magnified.

2. The method of making a holographic magnifier as set forth in claim 1 wherein the second plane wave front is converted into a spherical wave front by:

channeling the second plane wave front into the entrance of an optical fiber having a diameter small enough to convert the light exiting therefrom into a point source producing a spherical wave front.